(12) United States Patent
Khosravani et al.

(10) Patent No.: US 11,795,854 B2
(45) Date of Patent: Oct. 24, 2023

(54) METHOD FOR ASCERTAINING AN EXHAUST GAS COMPOSITION OF AN EXHAUST GAS OF AN INTERNAL COMBUSTION ENGINE

(71) Applicant: Robert Bosch GmbH, Stuttgart (DE)

(72) Inventors: Arman Khosravani, Freiberg am Neckar (DE); Arthur Bastoreala, Remseck am Neckar (DE); Christian Fleck, Gerlingen (DE); Tobias Pfister, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/054,650

(22) Filed: Nov. 11, 2022

(65) Prior Publication Data
US 2023/0220793 A1 Jul. 13, 2023

(30) Foreign Application Priority Data
Nov. 16, 2021 (DE) ...................... 10 2021 212 868.8

(51) Int. Cl.
*F01N 3/20* (2006.01)
*F01N 9/00* (2006.01)
*F01N 11/00* (2006.01)

(52) U.S. Cl.
CPC .............. *F01N 3/208* (2013.01); *F01N 3/206* (2013.01); *F01N 3/2066* (2013.01); *F01N 9/005* (2013.01);
(Continued)

(58) Field of Classification Search
CPC ............................................ F02D 2041/1468
See application file for complete search history.

(56) References Cited

U.S. PATENT DOCUMENTS

2003/0046928 A1* 3/2003 van Nieuwstadt .. F02D 41/1463
60/285
2010/0028228 A1* 2/2010 Gady .................. B01D 53/9495
422/111
(Continued)

FOREIGN PATENT DOCUMENTS

DE 102019128496 B3 12/2020
DE 102019220343 A1 6/2021

OTHER PUBLICATIONS

"Klaman-Filter" Wikipedia (2022), pp. 1-12; downloaded Sep. 6, 2022 from https://de.wikipedia.org/wiki/Kalman-Filter.
(Continued)

*Primary Examiner* — Binh Q Tran
(74) *Attorney, Agent, or Firm* — NORTON ROSE FULBRIGHT US LLP; Gerard Messina

(57) ABSTRACT

A method for ascertaining an exhaust gas composition of an exhaust gas of an internal combustion engine with regard to an ammonia fraction and a nitrogen oxides fraction in an exhaust gas system including an SCR catalytic converter. The method includes detecting, using a sensor, a first signal whose magnitude is a function of the nitrogen oxides fraction of the exhaust gas upstream from the SCR catalytic converter, detecting using a sensor a second signal whose magnitude is a function of the ammonia fraction and the nitrogen oxides fraction of the exhaust gas downstream from the SCR catalytic converter, storing the two signals over an observation period, and ascertaining the ammonia fraction and optionally the nitrogen oxides fraction of the exhaust gas downstream from the at least one SCR catalytic converter using a calculation rule that uses the two signals during the observation period as input variables.

9 Claims, 3 Drawing Sheets

(52) U.S. Cl.
CPC ............ *F01N 9/007* (2013.01); *F01N 11/005* (2013.01); *F01N 11/007* (2013.01); *F01N 2560/02* (2013.01); *F01N 2560/021* (2013.01); *F01N 2560/026* (2013.01); *F01N 2570/14* (2013.01); *F01N 2570/18* (2013.01); *F01N 2610/02* (2013.01); *F01N 2610/105* (2013.01); *F01N 2610/148* (2013.01); *F01N 2610/1453* (2013.01); *F01N 2900/04* (2013.01); *F01N 2900/1614* (2013.01); *F01N 2900/1616* (2013.01); *F01N 2900/1621* (2013.01); *F01N 2900/1622* (2013.01)

(56) References Cited

U.S. PATENT DOCUMENTS

| | | | | |
|---|---|---|---|---|
| 2010/0313548 | A1* | 12/2010 | Theis | F01N 3/208 60/276 |
| 2014/0373511 | A1* | 12/2014 | Osburn | F01N 3/2066 60/277 |
| 2017/0350291 | A1* | 12/2017 | Khaled | F01N 13/008 |
| 2019/0309671 | A1* | 10/2019 | Rajagopal | F01N 11/00 |
| 2019/0345861 | A1* | 11/2019 | Johansson | F01N 3/206 |
| 2020/0378288 | A1* | 12/2020 | Zhang | F01N 13/0097 |

OTHER PUBLICATIONS

"Bestimmtheitsmaß," Wikipedia (2022), pp. 1-29; downloaded on Sep. 6, 2022 from https://de.wikipedia.org/wiki/Bestimmtheitsma%C3%9F.

* cited by examiner

METHOD FOR ASCERTAINING AN EXHAUST GAS COMPOSITION OF AN EXHAUST GAS OF AN INTERNAL COMBUSTION ENGINE

FIELD

The present invention relates to a method for ascertaining an exhaust gas composition of an exhaust gas of an internal combustion engine, and a processing unit and a computer program for carrying out the method.

BACKGROUND INFORMATION

Selective catalytic reduction (SCR) using ammonia ($NH_3$) or ammonia-splitting reagents represents a suitable method for decreasing nitrogen oxides ($NO_x$) in oxygen-rich exhaust gases. The operating window of an SCR catalytic converter as well as its efficiency is determined primarily by the physical variables of temperature and space velocity. The degree of coverage of the catalytic converter with adsorbed $NH_3$ is crucial for the efficiency. To achieve the greatest possible nitrogen oxides conversions, it is often advantageous to operate the SCR system with a high ammonia filling level.

If the temperature of the filled SCR catalytic converter increases due to a sudden change in load on the internal combustion engine, the ammonia storage capability of the catalytic converter drops, which may result in ammonia slip. SCR catalytic converters that are installed near the engine in order to convert nitrogen oxides soon after the engine is started are affected particularly strongly by dynamic temperature gradients, and thus by such desorption events. A second SCR catalytic converter may therefore be provided downstream from the first SCR catalytic converter in the exhaust system in order to adsorb and subsequently convert ammonia from ammonia slip from the first catalytic converter.

With increasing requirements on the exhaust gas aftertreatment, systems including two SCR catalytic converters, each with their own metering device upstream from the particular SCR catalytic converter, are being increasingly used. Three $NO_x$ sensors (one upstream from the first catalytic converter and one downstream from each of the two catalytic converters) are usually installed for controlling and monitoring the SCR catalytic converters.

A $NO_x$ sensor typically provides a measured $NO_x$ concentration of the exhaust gas. However, due to the measuring principle, a $NO_x$ sensor typically has cross-sensitivity to ammonia ($NH_3$). In such a case, the $NO_x$ sensor always measures both components in the exhaust gas: $NO_x$ and $NH_3$. As a result, there is no direct information concerning the $NH_3$ portion (or the $NO_x$ portion) of the measured value.

SUMMARY

According to the present invention, a method for ascertaining an exhaust gas composition of an exhaust gas of an internal combustion engine, and a processing unit and a computer program for carrying out the method, are provided. Advantageous embodiments of the present invention are disclosed herein.

A method according to an example embodiment of the present invention for ascertaining an exhaust gas composition of an exhaust gas of an internal combustion engine with regard to an ammonia fraction and a nitrogen oxides fraction in an exhaust gas system including at least one SCR catalytic converter encompasses detecting, in particular with the aid of a sensor, a first signal whose magnitude is a function of the nitrogen oxides fraction of the exhaust gas upstream from the at least one SCR catalytic converter, detecting, in particular with the aid of a sensor, a second signal whose magnitude is a function of the ammonia fraction and the nitrogen oxides fraction of the exhaust gas downstream from the at least one SCR catalytic converter, storing the two signals at least over an observation period, and ascertaining the ammonia fraction and optionally also the nitrogen oxides fraction of the exhaust gas downstream from the at least one SCR catalytic converter with the aid of a calculation rule that uses the two signals during the observation period as input variables. Parameters of the calculation rule are adapted in such a way that a sum signal, calculated with the aid of the calculation rule, corresponds as exactly as possible to the detected second signal over the observation period. The ammonia and nitrogen oxides fractions are then preferably ascertained from the adapted parameters. In this way, without an additional costly sensor system, the ammonia slip through the at least one catalytic converter may be quantified, and the ammonia metering and the emission characteristics of the exhaust gas system may thus be improved.

In particular, according to an example embodiment of the present invention, the calculation rule assumes an efficiency of the at least one SCR catalytic converter, with regard to a nitrogen oxides reduction, that is constant during the observation period. This is one option to achieve very precise results, which may enable targeted minimization of relevant emission components, with relatively little effort. In particular, the calculation rule assumes an ammonia fraction of the exhaust gas, downstream from the at least one SCR catalytic converter, that is constant during the observation period. This is a relatively less simplistic assumption, since the ammonia fraction has only low dynamics. At the same time, such an assumption facilitates the calculation significantly and thus saves calculating capacity.

According to an example embodiment of the present invention, the calculation rule may advantageously ascertain the nitrogen oxides fraction downstream from the at least one SCR catalytic converter based on the dynamics of the first signal, since the dynamics of the signal are a function essentially of the nitrogen oxides fraction; the ammonia fraction typically has very low dynamics.

The most exact correspondence possible may advantageously be achieved by minimizing a sum of squared errors of a calculated sum signal and a detected sum signal. This represents a proven method for reliable optimization.

In particular, a coefficient of determination $R^2$, which indicates how strongly a scattering of the calculated sum signal may be correlated with a scattering of the detected signals, may be ascertained, and based on the coefficient of determination, it may be ascertained whether the adaptation of the parameters was successful. The ammonia fraction of the sum signal may in particular be assumed to be zero, and this assumption may be assessed as correct if coefficient of determination $R^2$ exceeds a predeterminable threshold. In this way, the calculation may possibly be greatly simplified while still providing useful information (for example, in the form of a binary statement of whether ammonia slip occurs). If the ammonia fraction is assumed to be different from zero, with a sufficiently large $R^2$ the ammonia fraction may be taken directly from the adapted parameters.

According to an example embodiment of the present invention, a processing unit according to the present invention, for example a control unit of a motor vehicle, is configured, in particular by programming, to carry out a method according to the present invention.

In addition, according to an example embodiment of the present invention, the implementation of a method according to the present invention, in the form of a computer program or computer program product that includes program code for carrying out all method steps, is advantageous since it incurs particularly low costs, in particular when an executing control unit is also utilized for further tasks and therefore is present anyway. Lastly, a machine-readable memory medium is provided, including a computer program as described above that is stored thereon. Suitable memory media or data media for providing the computer program are in particular magnetic, optical, and electrical memories such as hard disks, flash memories, EEPROMs, DVDs, and others. In addition, downloading a program via computer networks (Internet, intranet, etc.) is possible. Such downloading may take place in a wired or cabled manner or wirelessly (for example, via a WLAN, a 3G, 4G, 5G, or 6G connection, etc.).

Further advantages and embodiments of the present invention result from the description and the figures.

The present invention is schematically illustrated in the figures based on one exemplary embodiment, and described below with reference to the figures.

DETAILED DESCRIPTION OF EXAMPLE EMBODIMENTS

Figure 1:
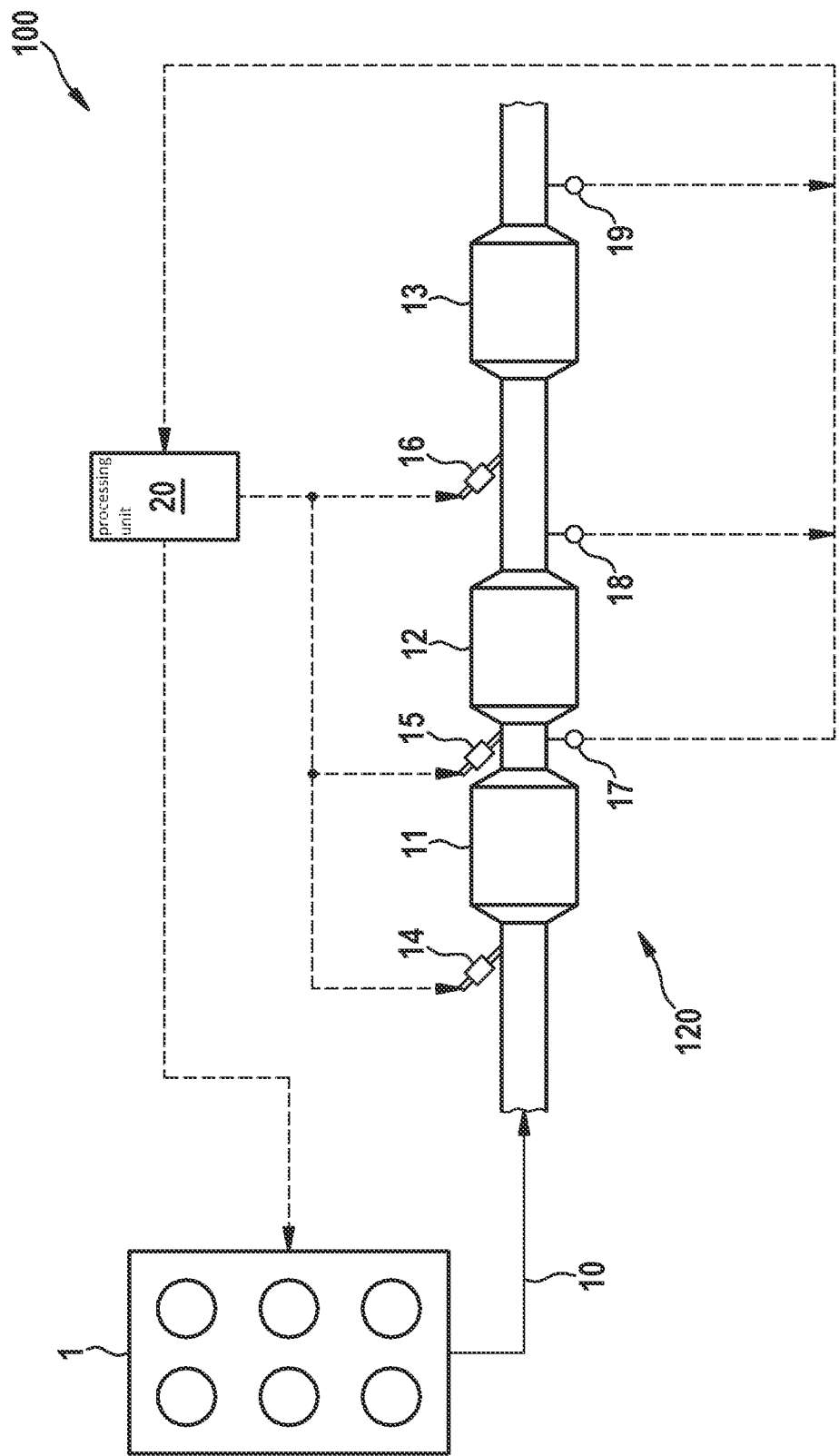
FIG. 1 shows an exhaust gas system, as may be used within the scope of the present invention, in a simplified schematic illustration.

FIG. 1 schematically shows an arrangement that includes an exhaust gas system, as may be used within the scope of the present invention, denoted overall by reference numeral 100.

Arrangement 100 includes an internal combustion engine 1 and multiple catalytic converters 11, 12, 13 situated downstream from internal combustion engine 1. In the illustrated example, multiple sensors 17, 18, 19 are provided, in particular sensors that are configured to ascertain a composition of the exhaust gas in the exhaust gas system. Sensors 17, 18, 19 are each connected in a data-conveying manner to a processing unit 20, for example a control unit of a motor vehicle that includes arrangement 100.

In the illustrated example, processing unit 20 is also connected in a data-conveying manner to internal combustion engine 1 and to external devices 14, 15, 16, for example secondary air supply lines, exhaust gas burners, reducing agent metering units, electric heating elements, or the like, which are in each case associated with one of catalytic converters 11, 12, 13. In particular, electric heating elements may also be situated directly in the catalytic converter or within a housing of the catalytic converter.

An exhaust gas 10 that is generated by internal combustion engine 1 is supplied to catalytic converters 11, 12, 13 in succession in order to be cleaned or detoxified therein. Each of catalytic converters 11, 12, 13 may be provided for a specific detoxification or for multiple simultaneous detoxifications. For example, a first catalytic converter 11, which may be situated near internal combustion engine 1, may be designed as a three-way catalytic converter (TWC), while a second catalytic converter 12 and a third catalytic converter 13 may encompass other catalytic converters and/or cleaning components such as $NO_x$ storage catalytic converters, SCR catalytic converters, particulate filters, or the like. However, second and third catalytic converters 12, 13 may likewise include one or multiple further TWCs. In addition, first catalytic converter 11 may also include one or multiple other cleaning components, and does not necessarily have to be designed as a TWC.

It is understood that for exhaust gas systems of a diesel engine, correspondingly adapted catalytic converters may be used, in particular oxidation catalytic converters, lean $NO_x$ traps (LNTs), SCR catalytic converters, particulate filters, and the like. For better readability, the present invention is explained in greater detail here based on an example with a gasoline engine as internal combustion engine 1.

Within the scope of the present invention, at least one of catalytic converters 11, 12, 13 is designed as an SCR catalytic converter that is supplied with ammonia or an ammonia-producing reducing agent, in particular urea solution, with the aid of a reducing agent metering unit (one of external devices 14, 15, 16). As explained at the outset, nitrogen oxides contained in the exhaust gas supplied to exhaust gas system 120 are reduced to nitrogen and water with the aid of the reducing agent, thus supplied, which may also be stored, at least in part, in the SCR catalytic converter. For better readability, in the following discussion it is assumed that first catalytic converter 11 is designed as a diesel oxidation catalytic converter (DOC), second catalytic converter 12 is designed as an SCR catalytic converter, and the third catalytic converter is likewise designed as an SCR catalytic converter. In such a case, sensors 17, 18, 19 are each designed as $NO_x$ sensors that output a signal whose intensity (for example, the magnitude of a signal voltage) is a function of a concentration of non-elemental nitrogen compounds in the particular analyzed exhaust gas. These types of sensors are typically not selective for nitrogen oxides, but instead have cross-sensitivity to other nitrogen compounds, in particular ammonia. External devices 15, 16, situated in each case upstream from SCR catalytic converters 12, 13, are considered here as metering devices for ammonia or urea solution.

Figure 2:
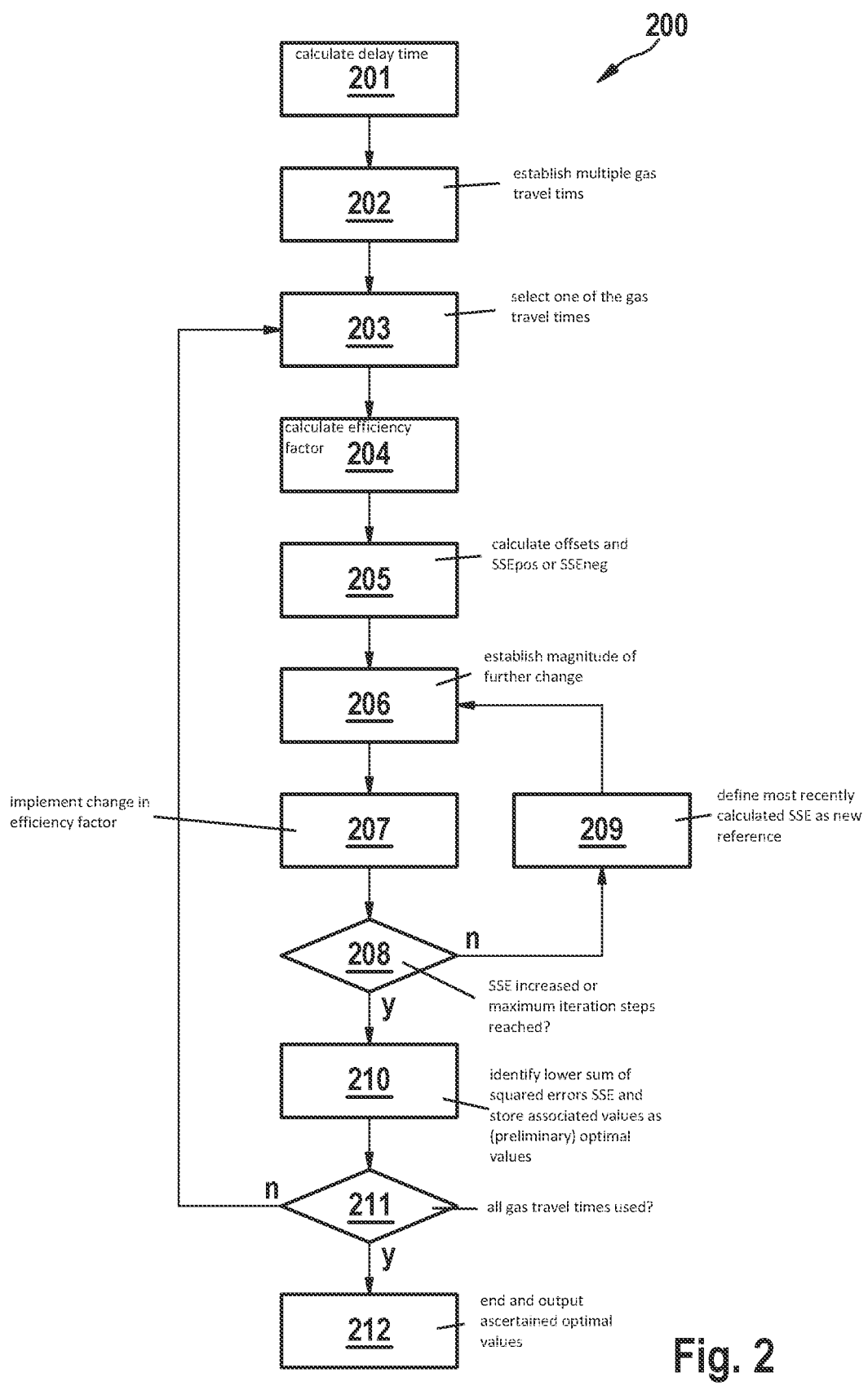
FIG. 2 shows one advantageous embodiment of a method according to the present invention in the form of a greatly simplified flowchart.

FIG. 2 schematically illustrates one advantageous embodiment of a method according to the present invention in the form of a simplified flowchart, denoted overall by reference numeral 200.

When device components are referenced in the description of method 200, these relate in particular to components discussed in conjunction with FIG. 1. For the sake of simplicity and to avoid repetitions, method 200 is described with reference to first SCR catalytic converter 12, but may also be carried out for second SCR catalytic converter 13 or for both SCR catalytic converters 12, 13.

Figure 3:
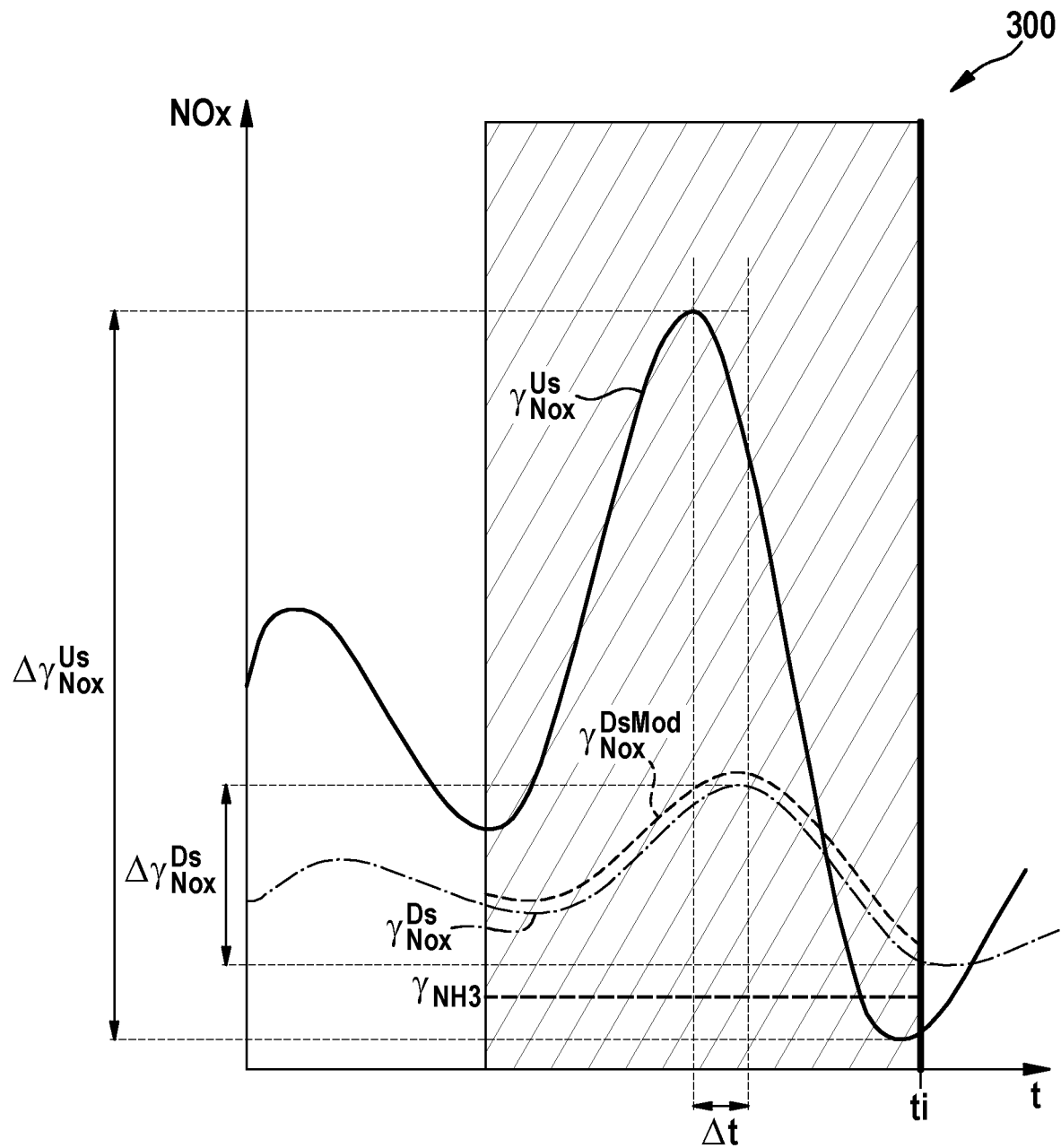
FIG. 3 shows a diagram that illustrates one advantageous embodiment of a method according to the present invention.

FIG. 3 shows a diagram illustrating the application of one advantageous embodiment of a method according to the present invention, for example method 200 from FIG. 2, and which is denoted overall by reference numeral 300. Time t is plotted on the abscissa of diagram 300, while the ordinate represents the magnitude of the signal of a sensor 17, 18, 19.

Method 200 described here is based on stored measured data of sensors 17, 18 for a predefined time period (also referred to as a register), which at the point in time of the evaluation is in the past, i.e., maps the history. Based on the history, parameters of a simple model of SCR catalytic converter 12 are optimized, and the fraction of nitrogen oxides and ammonia in the exhaust gas downstream from catalytic converter 12 is ascertained from the optimized parameters. Curve patterns $r_{NOx}^{Us}$ and $r_{NOx}^{Ds}$ illustrated in FIG. 3 are an example of such a history that is stored in the register.

The mentioned time period may be 3 s, a value being stored every 100 ms, for example. In the example, 31 measured values result for a signal, for example $r_{NOx}^{U}$ (=measured $NO_x$ concentration prior to or upstream from SCR catalytic converter 12). The measured $NO_x$ concentrations upstream from SCR catalytic converter 12 ($r_{NOx}^{Us}$) and downstream from SCR catalytic converter 12 ($r_{NOx}^{DsSens}$) are stored as measuring channels in the described register.

At a present point in time, for the input data and output data stored in this way a simple model is calculated which maps output values $r_{NOx}^{DsSens}$ (1 ... n) based on input values ($r_{NOx}^{Us}$ (1 ... n)):

$$r_{NOxSens}^{DsMod}(t) = k * r_{NOx}^{Us}(t-\Delta t) + r_{NH3}^{DsMod} \quad (1)$$

where the parameters have the following meanings:
k: 1—catalytic converter efficiency, i.e., factor for $NO_x$ slip (constant over the observation period)
$\Delta t$: gas travel time (constant over the observation period)
$r_{NH3}^{DsMod}$: modeled $NH_3$ concentration downstream from the SCR catalytic converter (constant over the observation period) and the output value
$r_{NOxSens}^{DsMod}$ modeled value at the location of the $NO_x$ sensor downstream from SCR catalytic converter 12 at any point in time.

The values for the parameters are determined at each evaluation point in time based on the stored data, using an optimization method. The objective of the optimization method is to find the parameters for which the sum of squared errors SSE is at a minimum.

$$SSE = \frac{1}{2} \sum \left( r_{NOx}^{DsSens} - \left( k * r_{NOx}^{Us}(t-\Delta t) + r_{NH3}^{DsMod} \right) \right)^2 \quad (2)$$

Conventional optimization methods such as the gradient method may be used for this purpose. Since this involves a greatly simplified model for a short observation period, it is also possible to find the optimal parameters on the control unit in a sufficiently short time, despite limited resources. The end of the optimization is reached (as is customary in the gradient method) when optimization criterion SSE is no longer greatly improved to a sufficient degree ($\Delta$SSE<threshold), or the maximum number of iterations have been carried out. It is understood that other optimization algorithms may also be used.

In addition, by use of equation (3) below, the change in $\Delta(t)$ or its direction with respect to the optimization is ascertained in order to quickly arrive at an appropriate value for the gas travel time.

$$\Delta(\Delta t) = -\gamma_2 \cdot \sum e \cdot \frac{k\left(dr_{NOx}^{Us}\right)}{dt} \quad (3)$$

where $e = r_{NO_x}^{DsSens} - r_{NO_x}^{DsMod}$

Depending on the operating situation and as a function of the recorded measured data, it is possible, with more or less good results, to achieve the optimization task. To establish at the end of the optimization whether the optimization was sufficiently good, optimization criterion SSE may be checked for a threshold (SSE<SSE threshold value=>optimization was sufficiently good). For a 3 s observation time, a value of 500 approximately corresponds, for example, to an average deviation of 4 ppm, and is a good guideline value.

Alternatively, the coefficient of determination may also be calculated and used according to formula (4):

$$R^2 = 1 - \sum \frac{\left(r_{NOx}^{DsSens} - r_{NOxSens}^{DsMod}\right)^2}{\sum \left(r_{NOx}^{DsSens} - \overline{r_{NOx}^{DsSens}}\right)^2} \quad (4)$$

where $\overline{r_{NOx}^{DsSens}}$ is the average value of the sensor values downstream from the SCR.

Coefficient of determination $R^2$ indicates how strongly the scattering of $NO_x$ model value $r_{NOxSens}^{DsMod}$ may be correlated with the scattering of sensor values $r_{NOx}^{DsMod}$. The value is 1 when this is the case 100% of the time, i.e., the signals are thus strongly correlated. $R^2$ assumes smaller values the more poorly the model depicts reality. If the coefficient of determination is above a threshold (0.5, for example) after the optimization, it may be assumed that the optimization was sufficiently good, and the parameters in question are highly likely to be very close to the actual $NO_x$ and $NH_3$ values. The $NH_3$ value may be read off directly) The $NO_x$ fraction may be calculated from term $k*r_{NOx}^{Us}$ ($t-\Delta t$).

In principle, the described method can function only when the two signal components ($NO_x$ and $NH_3$) have a different characteristic or different dynamics. Since it is assumed that the $NH_3$ signal does not change during the short observation period, the $NO_x$ signal (if >0) must have certain dynamics. This is checked by determining the gradients (i.e., difference quotients (cf. formula 5)) of $NO_x$ sensor signal $r_{NOx}^{Us}$ upstream from the catalytic converter during the stored time period. These gradients are compared to a threshold value (25 ppm/s, for example). If the proportion of the gradient values higher than this threshold is above a threshold value (80%, for example), the dynamics of the input signal are sufficiently high, if the SCR catalytic converter allows $NO_x$ to pass through, that output signal $r_{NOx}^{DsSens}$ likewise has sufficiently high dynamics to distinguish from $NH_3$.

$$\left.\frac{dr_{NOx}^{Us}}{dt}\right|_i = \frac{r_{NOx}^{Us}|_i - r_{NOx}^{Us}|_{i-1}}{dt} \quad (5)$$

where i is the index of a loop through the stored register, and dt is the sampling rate.

Since the tolerances of the $NO_x$ sensor have a relatively strong effect for very small $NO_x$ sensor values $r_{NOx}^{DsSens}$, the optimization and signal assessment may be limited to values above a threshold value (10 ppm, for example). In this case, it is meaningful to start the assessment only when a sufficiently high proportion of $NO_R$ sensor values (at least 70%, for example) above the threshold value are present.

In one alternative embodiment, the method is carried out without an offset, i.e., $r_{NH3}^{DsMod}$. In this variant, the optimization is successful only when primarily $NO_R$ is involved and the $NH_3$ fraction is very small. The success may be read off at the coefficient of determination (cf. formula 4). This means that if the coefficient of determination is above a threshold (0.8, for example), the signal involves primarily $NO_R$. If the coefficient of determination is below a threshold, it is highly likely that a fairly large $NH_3$ fraction is also present. Thus, in contrast to the method described above, this embodiment results in a binary statement. This information may also be useful for the metering strategy.

The parameters to be determined, as described above, may be determined by an optimization. As an alternative or in addition to a determination of the starting values for the optimization, the parameters may be calculated based on the stored measured data (cf. FIG. 3):

Delay time $\Delta t$: The delay time is calculated based on the time interval of the high points or low points of the $NO_R$ sensor signal upstream and downstream from the SCR catalytic converter ($r_{NOx}^{Us}$ and $r_{NOx}^{DsSens}$) For recognizing the high points or low points in the recorded measured data, the points in time of the changes in algebraic sign of the gradients/difference quotients are determined (positive gradient followed by negative gradient=>high point, and vice versa). Based on these points in time, the delay time may be calculated separately for each high point and each low point. This represents step 201 of method 200 as illustrated in FIG. 2.

For the subsequent optimization, multiple gas travel times for the calculation, for example three different gas travel times $\Delta t_1$, $\Delta t_2$, $\Delta t_3$ that differ slightly from one another, are established in a step 202 based on the ascertained delay time(s).

One of the gas travel times established in step 202 is selected in a step 203 for the further calculation.

Efficiency factor k: The efficiency factor may be calculated based on the maximum changes in signals $r_{NOx}^{Us}$ and $r_{NOx}^{DsSens}$ during the observation period. This takes place in a step 204.

$$k = \frac{\Delta r_{NOx}^{DsSens}}{\Delta r_{NOx}^{Us}} \quad (6)$$

where $\Delta r_{NOx}^{DsSens} = r_{NOx}^{DsSens\_Max} - r_{NOx}^{DsSens\_Min}$ and $\Delta r_{NOx}^{Us} = r_{NOx}^{Us\_max} - r_{NOx}^{Us\_Min}$, as illustrated in FIG. 3.

Based on calculated delay time $\Delta t$ and determined efficiency factor k, optimal offset $r_{NH3}^{DsMod}$ may be determined as the average value of all differences of the sensor value and of modeled $NO_x$ fraction $r_{NOx}^{DsSens} - k \cdot r_{NOx}^{Us}(t-\Delta t)$. In the illustrated example, this likewise takes place in step 204.

$$r_{NH3}^{DsMod} = \overline{r_{NOx}^{DsSens}|_{1...n} - k \cdot \overrightarrow{r_{NOx}^{Us}}|_{1...n}} \quad (7)$$

where $\overrightarrow{r_{NOx}^{Us}}$ is the $NO_x$ signal, shifted by $\Delta t$, upstream from the catalytic converter ($=r_{NOx}^{Us}(t-\Delta t)$).

The values determined in this way may be used directly in the model or used as initialization values for a subsequent optimization. In the latter case, which corresponds to the example illustrated in FIG. 2, sum of squared errors SSE is also calculated in step 204, based on the initialization values.

For two values $k_{pos}$ and $k_{neg}$ that deviate in various directions from the initial value of efficiency factor k by the same small amount, associated offsets $r_{NH3pos}$ and $r_{NH3neg}$ and respective $SSE_{pos}$ or $SSE_{neg}$ are calculated in a step 205.

The algebraic sign for the further optimization of efficiency factor k is subsequently established in a step 206 by selecting the algebraic sign for which the smaller sum of squared errors resulted from $SSE_{pos}$ and $SSE_{neg}$ in step 205. In addition, the magnitude of further change $\Delta k$ of efficiency factor k is established in step 206, based on the ratio of the change in sum of squared errors $\Delta SSE$ to the change in efficiency factor $\Delta k$.

This change in efficiency factor k is implemented, and in turn offset $r_{NH3}$ and SSE are calculated, in step 207.

It is subsequently checked in a step 208 whether SSE has once again increased and/or whether a maximum number of iteration steps has been reached. If neither is the case (output "n"), method 200 returns to step 206, the most recently calculated SSE being defined as a new reference (step 209). In contrast, if it is established in step 208 that the SSE has once again increased and/or that the maximum number of iterations has been reached (output "y"), the lowest of ascertained sum of squared errors SSE is identified, and associated values $\Delta t$, k, and $r_{NH3}$ are stored as (preliminary) optimal values, in a step 210.

A check is then made in a step 211 as to whether all gas travel times defined in step 202 have been used as an initial value for the calculation (step 204). If this is the case (output "y"), the method ends in a step 212 (and outputs the ascertained optimal values). Otherwise, (output "n"), the method returns to step 203 and selects a further of the multiple gas travel times, not yet used, for the further calculation.

As described above, there are particularly suitable operating conditions (in particular, high dynamics upstream from the SCR catalytic converter) under which the determination of the $NO_x/NH_3$ fraction functions particularly well. At the same time, it is not always guaranteed that the model is sufficiently accurate (SSE<threshold or coefficient of determination>threshold). As a result, a valid $NH_3$ and $NO_x$ model signal may be calculated only occasionally. Depending on the application, it may be meaningful to "freeze" the $NH_3$ signal (i.e., assume it to be constant) at times for which no new signal is calculated, and to calculate the $NO_x$ value based on the difference between $NO_x$ sensor value $r_{NOx}^{DsSens}$ and frozen $NH_3$ value $r_{NH3}^{Freeze}$. The maximum frozen value may be as great as the present sensor value (since no more $NH_3$ can ever be present than the signal indicated by the $NO_x$ sensor downstream from the SCR catalytic converter). The frozen value thus decreases along with the sensor value as soon as the latter falls below the previously frozen value. Only when a new valid value is available, is this value adopted.

Alternatively, offset $r_{NH3}^{DsMod}$ may be filtered prior to the freezing. In particular, conventional exponentially weighted moving average (EWMA) filters are suited for this purpose, although other filters may also be used.

In a further embodiment, instead of the simple model for the observation period, a more complex model, for example a kinetic model, is calculated. In this case, the starting filling level may be used as a variable parameter. Either only the $NO_x$ fraction is included in the calculation (and the $NH_3$ fraction continues to be held constant), or the $NH_3$ fraction is also included in the calculation. If the optimization is successful, in this case the filling level may be directly corrected via a larger or smaller metered quantity.

In a further embodiment, the optimizer is started using the values of the preceding optimization run. As a further alternative initialization value for $\Delta t$, the volume flow of the exhaust gas may also be calculated from the geometry, mass flow, pressure, and temperature, and the theoretical delay may be calculated from the volume flow. In many catalytic converter models this variable is present as the gas travel time.

It is understood that some of the mentioned steps of method 200 may also be carried out in another, for example reverse, order. In addition, the method is not necessarily limited to being carried out in a stepwise manner, so that the described "steps" of method 200 may possibly also be carried out, in whole or in part, in parallel to one another or simultaneously and continuously.

What is claimed is:

1. A method for ascertaining an exhaust gas composition of an exhaust gas of an internal combustion engine with regard to an ammonia fraction and a nitrogen oxides fraction in an exhaust gas system including at least one SCR catalytic converter, the method comprising the following steps:
    detecting, using a sensor, a first signal whose magnitude is a function of the nitrogen oxides fraction of the exhaust gas upstream from the at least one SCR catalytic converter;
    detecting, using a sensor, a second signal whose magnitude is a function of the ammonia fraction and the nitrogen oxides fraction of the exhaust gas downstream from the at least one SCR catalytic converter;
    storing the first and second signals at least over an observation period; and
    ascertaining the ammonia fraction and the nitrogen oxides fraction of the exhaust gas downstream from the at least one SCR catalytic converter using a calculation rule that uses the first and second signals during the observation period as input variables, parameters of the calculation rule being adapted in such a way that a sum signal, calculated using the calculation rule, corresponds as exactly as possible to the detected second signal over the observation period, and the ammonia and the nitrogen oxides fractions being ascertained from the adapted parameters.

2. The method as recited in claim 1, wherein the calculation rule assumes an efficiency of the at least one SCR catalytic converter, with regard to a nitrogen oxides reduction, that is constant during the observation period.

3. The method as recited in claim 1, wherein the calculation rule ascertains the nitrogen oxides fraction downstream from the at least one SCR catalytic converter based on dynamics of the first signal.

4. The method as recited in claim 1, wherein the calculation rule assumes an ammonia fraction of the exhaust gas, downstream from the at least one SCR catalytic converter, that is constant during the observation period.

5. The method as recited in claim 1, wherein a most exact correspondence possible is reached by minimizing a sum of squared errors of a calculated sum signal and a detected signal, an ascertainment, based on the minimized sum of squared errors, of whether the adaptation of the parameters was successful.

6. The method as recited in claim 5, further comprising ascertaining a coefficient of determination, which indicates how strongly scattering of the calculated sum signal may be correlated with a scattering of the detected first and second signals, and an ascertainment, based on the coefficient of determination, of whether the adaptation of the parameters was successful.

7. The method as recited in claim 6, wherein the ammonia fraction is assumed to be zero, and the assumption is assessed as correct when the coefficient of determination exceeds a predeterminable threshold and/or when the minimized sum of squared errors falls below a predeterminable threshold value.

8. A processing unit configured to ascertain an exhaust gas composition of an exhaust gas of an internal combustion engine with regard to an ammonia fraction and a nitrogen oxides fraction in an exhaust gas system including at least one SCR catalytic converter, the processing unit configured to:
    detect, using a sensor, a first signal whose magnitude is a function of the nitrogen oxides fraction of the exhaust gas upstream from the at least one SCR catalytic converter;
    detect, using a sensor, a second signal whose magnitude is a function of the ammonia fraction and the nitrogen oxides fraction of the exhaust gas downstream from the at least one SCR catalytic converter;
    store the first and second signals at least over an observation period; and
    ascertain the ammonia fraction and the nitrogen oxides fraction of the exhaust gas downstream from the at least one SCR catalytic converter using a calculation rule that uses the first and second signals during the observation period as input variables, parameters of the calculation rule being adapted in such a way that a sum signal, calculated using the calculation rule, corresponds as exactly as possible to the detected second signal over the observation period, and the ammonia and the nitrogen oxides fractions being ascertained from the adapted parameters.

9. A non-transitory machine-readable memory medium on which is stored a computer program for ascertaining an exhaust gas composition of an exhaust gas of an internal combustion engine with regard to an ammonia fraction and a nitrogen oxides fraction in an exhaust gas system including at least one SCR catalytic converter, the computer program, when executed by a processing unit, causing the processing unit to perform the following steps:
    detecting, using a sensor, a first signal whose magnitude is a function of the nitrogen oxides fraction of the exhaust gas upstream from the at least one SCR catalytic converter;
    detecting, using a sensor, a second signal whose magnitude is a function of the ammonia fraction and the nitrogen oxides fraction of the exhaust gas downstream from the at least one SCR catalytic converter;
    storing the first and second signals at least over an observation period; and
    ascertaining the ammonia fraction and the nitrogen oxides fraction of the exhaust gas downstream from the at least one SCR catalytic converter using a calculation rule that uses the first and second signals during the observation period as input variables, parameters of the calculation rule being adapted in such a way that a sum signal, calculated using the calculation rule, corresponds as exactly as possible to the detected second signal over the observation period, and the ammonia and the nitrogen oxides fractions being ascertained from the adapted parameters.

\* \* \* \* \*